US007014443B2

(12) United States Patent
Hinzpeter et al.

(10) Patent No.: US 7,014,443 B2
(45) Date of Patent: Mar. 21, 2006

(54) TABLETTING MACHINE

(75) Inventors: Jürgen Hinzpeter, Schwarzenbek (DE); Ingo Schmidt, Schwarzenbek (DE); Jörg Gaedecke, Geesthacht (DE); Ulrich Gathmann, Hamburg (DE); Joachim Greve, Pogeez (DE); Enrico Gand, Büchen (DE); Klaus-Peter Preuss, Mölln (DE); Alexander Oldenburg, Dassendorf (DE)

(73) Assignee: Fette GmbH, (DE)

( * ) Notice: Subject to any disclaimer, the term of this patent is extended or adjusted under 35 U.S.C. 154(b) by 0 days.

(21) Appl. No.: 10/371,551

(22) Filed: Feb. 21, 2003

(65) Prior Publication Data

US 2003/0161907 A1 Aug. 28, 2003

(30) Foreign Application Priority Data

Feb. 23, 2002 (DE) ................................ 102 07 764

(51) Int. Cl.
*B29C 43/58* (2006.01)

(52) U.S. Cl. ...................... 425/167; 425/345; 425/422; 700/195; 700/206

(58) Field of Classification Search ........ 425/135–173, 425/78, 344–355, 422; 700/206, 249, 195, 700/197, 108, 212; 702/184; 264/39
See application file for complete search history.

(56) References Cited

U.S. PATENT DOCUMENTS

| | | | | |
|---|---|---|---|---|
| 6,047,579 A * | 4/2000 | Schmitz | ...................... | 700/179 |
| 6,122,565 A * | 9/2000 | Wenning et al. | ............ | 700/249 |

FOREIGN PATENT DOCUMENTS

| | | |
|---|---|---|
| DE | 199 16 757 A1 | 10/1999 |
| DE | 199 29 377 A1 | 11/2000 |
| DE | 199 33 817 A1 | 1/2001 |

* cited by examiner

*Primary Examiner*—Robert Davis
*Assistant Examiner*—Thu Khanh T. Nguyen
(74) *Attorney, Agent, or Firm*—Wall Marjama & Bilinski LLP

(57) ABSTRACT

Tabletting machine in the form of a rotary press, includes a rotor accommodating top and bottom stamping dies that cooperate with molds of a mold plate, rotor associated cam segments, and pressure rollers for actuating the stamping dies, a filling equipment, a stripping device for tablets knocked out of the mold and a computing system for controlling the tabletting machine following a predetermined program and for processing data provided by signal transmitters of the tabletting machine, and for monitoring the machine functions. At least a part of the components and/or subassemblies features a transponder having at least one stored identity number, characterizing the components and/or subassemblies. At least one read head connected with the computing system permits the transponder of the component and/or subassembly to be wirelessly read out even in the assembled state. The read-out data can be compared with a predetermined program for the arrangement and/or function of the components and/or subassemblies in the computing system.

3 Claims, 1 Drawing Sheet

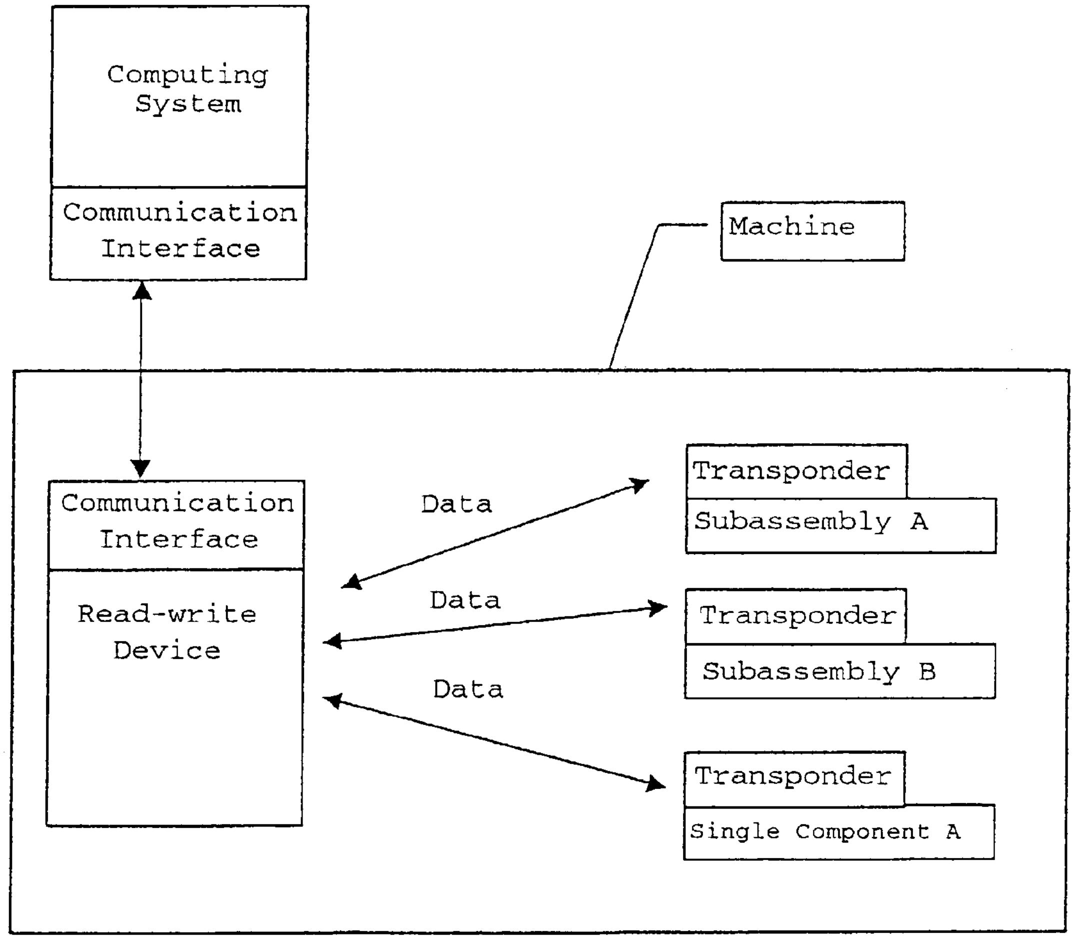
Computing System
Communication Interface
Machine
Communication Interface
Read-write Device
Data
Data
Data
Transponder
Subassembly A
Transponder
Subassembly B
Transponder
Single Component A

TABLETTING MACHINE

FIELD OF THE INVENTION

The invention is related to a tabletting machine in the form of a rotary press.

BACKGROUND OF THE INVENTION

A conventional equipment for the production of tablets or the like usually consists of a rotary press, a switch cabinet and a computing system. The rotary press is connected with the switch cabinet and the computing system via cables, which can be arranged in spatial separation from the rotary press. Furthermore, there are additional peripheral devices into which shall not be gone here farther. A typical rotary press features a rotor which accommodates a set of top and bottom stamping dies. The stamping dies co-operate with moulds in a mould-plate of the rotor, being actuated by cam segments and pressure rollers when the rotor rotates. A stationary filling equipment successively fills the bore holes of the moulds, before the filled-in material is compressed with the aid of the stamping dies. Subsequently knocking out occurs with the aid of the bottom die and the top die being removed, a stripping device providing for the removal of the knocked-out tablets from the machine.

The operation and the monitoring of such a rotary press is incumbent on the computing system. For this purpose, the rotary press contains a number of signal transmitters, which deliver signals related to the condition, arrangement and function of components and subassemblies of the press, which are processed in the computing system. For instance, pressure measuring devices are associated to the pressure rollers, which determine the maximum force of pressure or even its devolution. The data are then recorded in the computing system for the sake of compliance with the desired parameters of the tablet to be produced. Further signal transmitters serve for the correct assembly of the individual subassemblies or components and the examination of its condition, respectively. Only with proper condition and duly installation of the corresponding components and subassemblies, the correct operation of such a rotary press is ensured.

It is known to supervise the installation of cam segments with the aid of stop switches. Only upon correct fitting position, a stop switch is actuated and the computing system can release the operation, when corresponding release signals have been received from the individual sensors of the machine. However, with the known rotary presses it is disadvantageous that the individual signal transmitters have to be connected with the computing system via electric cables, which results in a considerable expenditure.

SUMMARY OF THEINVENTION

The invention has the objective to provide a tabletting machine in form of a rotary press, to which a complex wiring of individual signal transmitters, sensors or switches is not applicable.

This objective is solved by the present invention.

In the invention, at least a part of the components or subassemblies of the tabletting machine or rotary press, respectively, is equipped with a transponder, in which is stored at least one identity number characterising the component and/or subassembly. Further, a read- or combined write-read head connected with the computing system is provided, by which the transponders of the components and/or the subassemblies can be wirelessly read out even in the assembled state. In the computing system, the read-out data are compared with a predetermined plan for the arrangement and/or function of the components or subassemblies.

In the transponder, several informations can be stored and requested, respectively. To these belongs, at the one side, the already mentioned identity number, which characterises the type of component or subassembly, respectively. Furthermore, process relevant data can be stored directly into the subassembly or individual component, respectively. In the disassembled state of the subassemblies and/or components, the data remain preserved.

With the aid of the invention, a series of significant advantages is achieved. The invention facilitates the management of the subassemblies and components. Furthermore, the operational -reliability is increased. After the installation of subassemblies and components, respectively, it can easily be determined whether the single components and subassemblies are assembled according to the plan, namely at the correct site an in the correct configuration. Already at the delivery of the tabletting machine, an automatic comparison between machine card and delivery condition can be undertaken in the manner according to the invention.

With the aid of the invention, the different construction of subassemblies and single components with respect to options, customer adapted constructions and machine type may be recognised, as mentioned earlier. Furthermore, the compatibility of installed subassemblies and components can be examined. For example, it is ascertainable whether an installed cam segment matches a type of stamping die.

With the aid of the invention, a wearing check-up can also be performed, when corresponding signal transmitters are present which can recognise a wearing. However, a wearing check-up can also take place via the storage of the actual running time. Wearing parts have a customary tool life. After decay of this tool life a replacement is indicated. This can be surveyed with the aid of the computer.

After all, with the aid of the invention it can be prevented that externally produced components and subassemblies, which are potentially of inferior quality, be installed in an already mounted rotary press as a spare part.

The readout of the transponders can occur with the aid of a read head, in desired sequence and in desired time intervals, controlled by the computing system. In fact, it is conceivable to construct the read head e.g. in a movable manner, so that an operator reads out the individual transponders from time to time with the aid of the read head. However, according to one embodiment of the invention, the arrangement of the read head in the machine is to be preferred. The read head can then be brought into combination with the external computing system via an interface. Thus, an elaborate wiring is avoided, by which the signal transmitters would otherwise have to be connected with the computing system.

If one single read head is not sufficient, with respect to the read-out capacity, to request all transponders of a rotary press, a plurality of read heads, in a distance to each other, can also be accommodated in the frame of the machine. Alternatively, it can be designed movable and servo controlled in a unilaterally favoured manner. The control of the read heads, with respect to the read-out sequence, can be programmed in the computing unit.

BRIEF DESCRIPTION OF THE DRAWINGS

FIG. 1 depicts a block diagram of an electronic identification system for a tabletting machine according to the invention.

The single FIGURE shows an electronic identification system for a tabletting machine according to the invention in a block diagram.

DETAILED DESCRIPTION

A rotary press is designated in FIG. 1 as a machine, featuring a number of subassemblies and single components, namely here subassemblies A and B and one single component A. With single component, e.g. a cam segment is to be understood. As a subassembly, e.g. the filling device can be taken. A transponder is associated to each subassembly and single component, respectively. As is generally known, a transponder is a passive electronic component for storage and communication, in which a series of data can be stored, which can be written in and read out, namely by contact operated or by contactless communication with a head for writing and reading, respectively. Such head is designated in FIG. 1 by read-write device. The communication is indicated by the double arrows which are distinguished by the word data. A communication interface is associated to the read-write device, which is in contact with an external communication interface of the computing system, e.g. via a cable.

What is claimed is:

1. A tabletting machine in the form of a rotary press, said press having a rotor which accommodates a set of top and bottom stamping dies that cooperate with molds of a mold plate of the rotor, cam segments associated to the rotor, and pressure rollers for the actuation of the stamping dies, said tabletting machine further including filling equipment for successively filling the bore holes of the molds, a stripping device for the removal of tablets knocked out of the molds, and a computing system for controlling the operation said tabletting machine following a predetermined program, for processing of data that is provided by signal transmitters of the tabletting machine, and for monitoring the functions of the machine, said machine further including a read head connected to the computing system and a plurality of wireless transponders, each of said wireless transponders being provided to each of at least one component and subassembly of said machine and having a memory into which at least one identification number, characterizing said at least one component and subassembly, is stored, said computing system further having stored into memory, a plan for the installation of each of the components and subassemblies of the tabletting machine, wherein said read head permits the transponders to be read after assembly of the tabletting machine and in which data read out by the read head from the transponders is compared with the plan of the components and subassemblies stored in the computing system.

2. The machine of claim 1, wherein process relevant data is stored in the transponders.

3. The machine of claim 1, wherein the actual running time of at least one of the components and/or the subassemblies in the transponders is stored in the transponders.

* * * * *